United States Patent [19]

Grünewald et al.

[11] 4,381,467
[45] Apr. 26, 1983

[54] MULTIPLANAR CONDUCTOR BAR FOR ELECTRIC MACHINES, ESPECIALLY FOR TURBO-GENERATORS

[75] Inventors: Peter Grünewald, Essen; Peter Jung, Mülheim; Rudolf von Musil, Berlin, all of Fed. Rep. of Germany

[73] Assignee: Kraftwerk Union Aktiengesellschaft, Mülheim, Fed. Rep. of Germany

[21] Appl. No.: 231,027

[22] Filed: Feb. 3, 1981

Related U.S. Application Data

[63] Continuation of Ser. No. 20,027, Mar. 13, 1979, abandoned.

[30] Foreign Application Priority Data

Mar. 15, 1978 [DE] Fed. Rep. of Germany ....... 2811249

[51] Int. Cl.³ .............................................. H02K 3/14
[52] U.S. Cl. ..................................... 310/213; 174/34; 336/187
[58] Field of Search .......................... 310/213; 174/34; 336/187; 29/596

[56] References Cited

U.S. PATENT DOCUMENTS

| Re. 27,489 | 9/1972 | Brenner | 310/213 |
| 2,821,641 | 1/1958 | Ringland | 310/213 |
| 3,283,280 | 11/1966 | Fischer | 174/34 |
| 3,368,087 | 2/1968 | Madsen | 310/52 |
| 3,585,428 | 6/1971 | Bennington | 310/213 |
| 3,647,932 | 3/1972 | Heller | 174/34 |
| 3,825,783 | 7/1974 | Duffert | 310/213 |

FOREIGN PATENT DOCUMENTS

| 635116 | 7/1963 | Belgium | 310/213 |
| 478873 | 7/1929 | Fed. Rep. of Germany | 310/213 |
| 1231342 | 12/1966 | Fed. Rep. of Germany | 310/213 |

OTHER PUBLICATIONS

"Herstellung der Wicklungen Electricher Maschine"; H. Sequenz; Springer Verlag; pp. 78-81; 310/213.

Primary Examiner—R. Skudy
Attorney, Agent, or Firm—Herbert L. Lerner

[57] ABSTRACT

A multiplanar conductor bar for electric machines comprising subconductors superimposed radially in a number n of circumferentially mutually adjacent planes, n being a whole, even number between six and ten, inclusive, and transposed by at least 360°. A total of two groups of two adjacent subconductor planes, respectively, are formed at upper and lower sides of the multiplanar conductor bar by exclusively mutual crossover of the semiconductors of the two adjacent planes. A total of n/2−1 groups of four adjacent subconductor planes, respectively, are formed at the upper and lower sides of the multiplanar conductor bar by exclusively mutual crossover of the subconductors of the respective four adjacent subconductor planes and exclusively in a transition between the respective outer and the respective inner planes of the four planes. The respective groups of four adjacent planes are mutually offset at the lower side with respect to the upper side by two subconductor planes. Each of the subconductors traverse all layer levels between two crossover points in each subconductor plane alternatingly in descending and ascending order in successive planes. The individual crossed-over subconductors of each of the subconductor planes are stacked so as to form a respective subconductor column, the subconductor columns being mutually telescoped and united into the multiplanar conductor bar.

1 Claim, 37 Drawing Figures

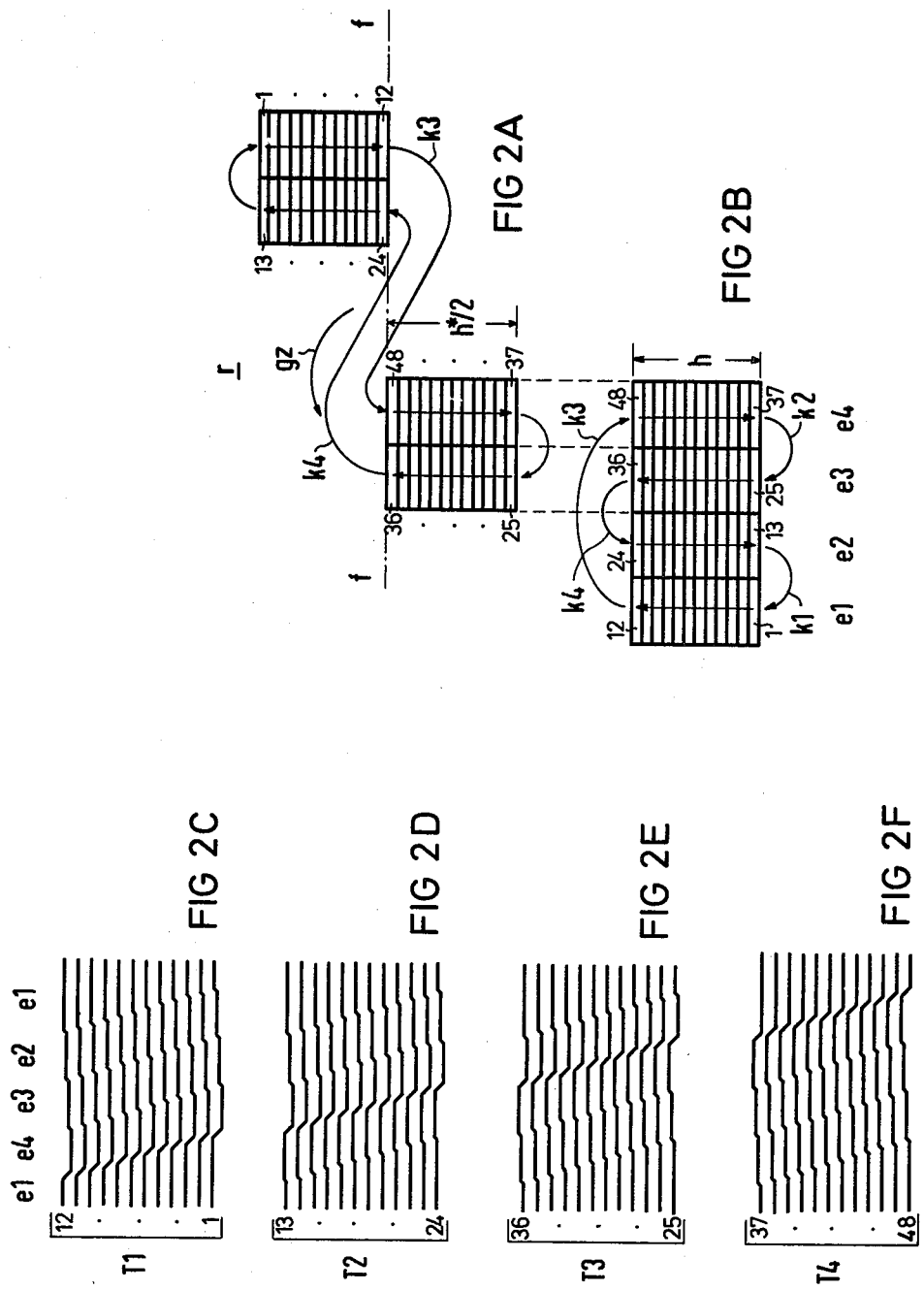

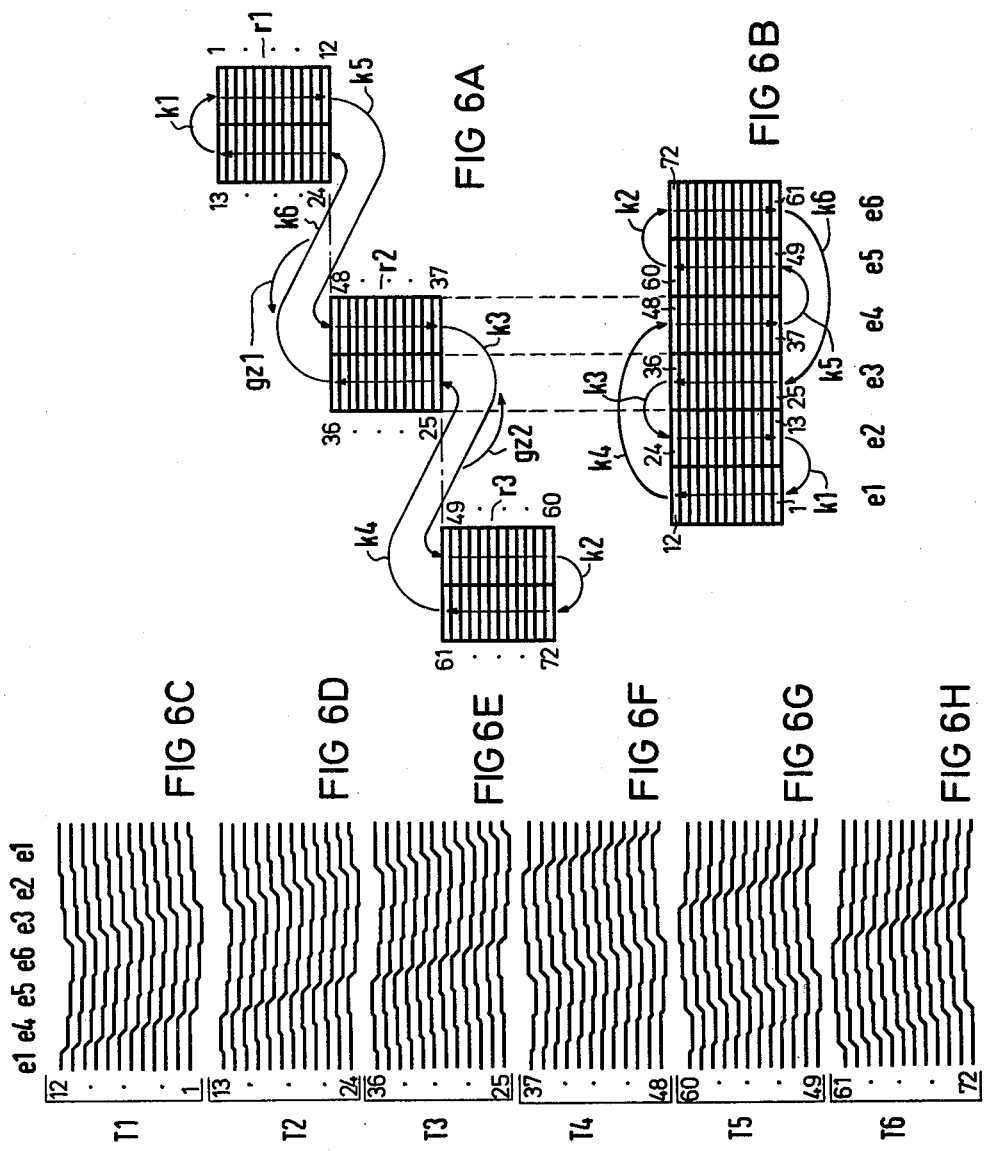

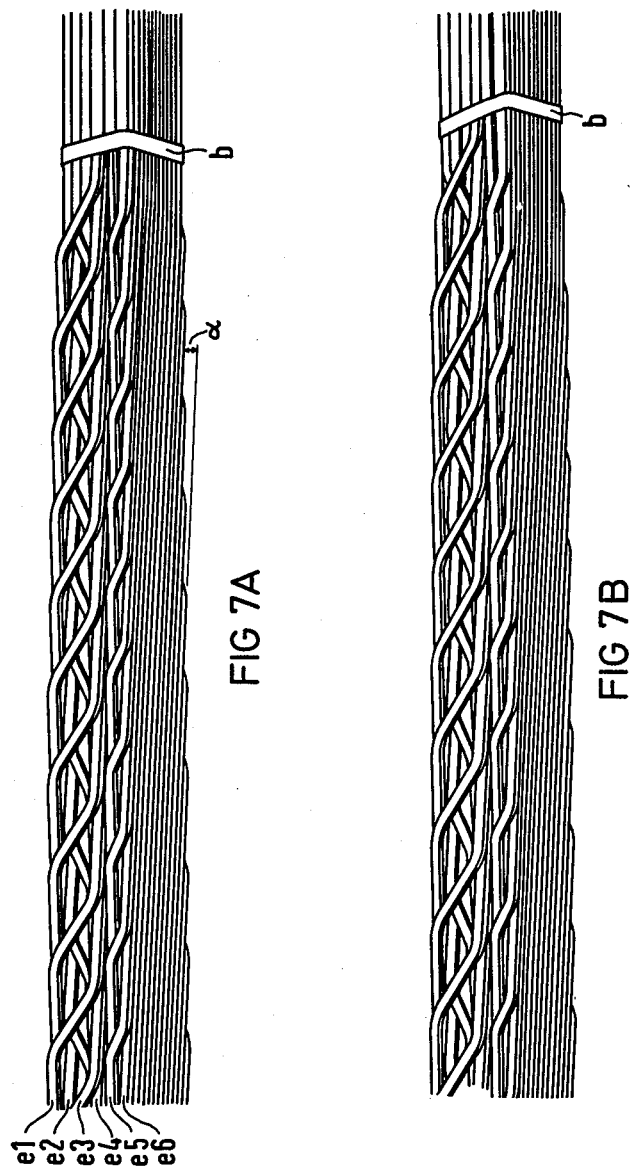

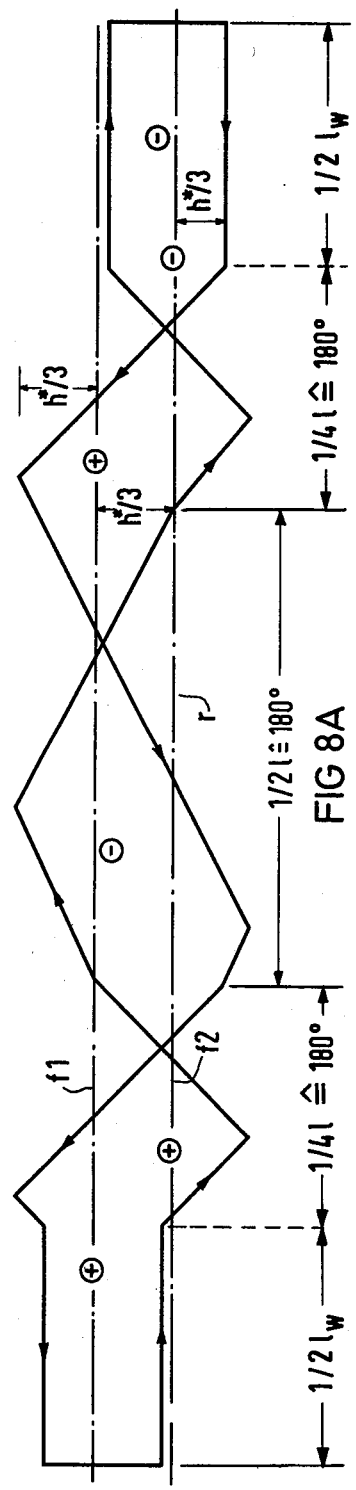
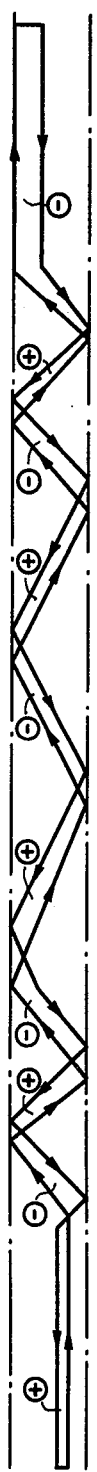
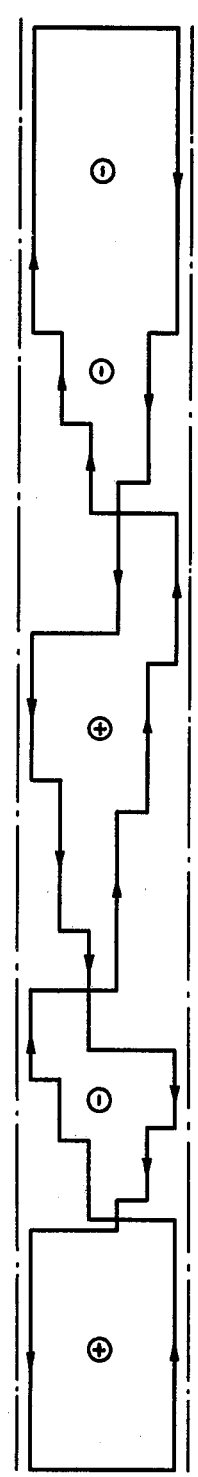
FIG 8A
FIG 8B
FIG 8C

MULTIPLANAR CONDUCTOR BAR FOR ELECTRIC MACHINES, ESPECIALLY FOR TURBO-GENERATORS

This is a continuation of application Ser. No. 020,027, filed Mar. 13, 1979, now abandoned.

The invention relates to a multiplanar conductor bar for electric machines, especially for turbo-generators, having subconductors superimposed radially in at least four circumferentially mutually adjacent planes and transposed by at least 360°. The invention further relates to a method of producing the multiplanar conductor bar as well as to the use of such a conductor bar for the stator and/or air gap winding of a superconductive turbogenerator.

A multiplanar conductor bar of the foregoing general type is known from German Published Prosecuted Application DE-AS No. 1 231 342. This is concerned with a 4-plane conductor bar, in which the subconductors of the two inner planes traverse the respective adjacent outer plane and, thereafter, the adjacent inner plane with opposite directions of twist or transposition over the twisting or transposition region, while the subconductors of the two outer planes traverse the respective non-adjacent plane and, thereafter, the oppositely disposed outer plane. In order to obtain the desired twist or transposition, such a bar must be braided, which calls for relatively high production expense.

It is an object of the invention of the instant application, however, to provide a multiplanar conductor bar with four planes twisted or transposed relative to one another, and furthermore, a 6-, 8- and so forth or, generally speaking, an n-plane conductor bar (n=4, 6, 8 ..., n−2, n), for the production of which no braiding work is required, but rather, in which the overall multiplanar conductor bar can be produced by offsetting or crossing over the individual subconductors in an offsetting or crossover template, joining the offset or crossed-over subconductors to form subconductor columns, and then joining or uniting the subconductor columns.

It is a further object of the invention to provide a method of producing the just-mentioned multiplanar conductor bar by which it is possible to produce not only 4-plane or 6-plane conductor bars, but also conductor bars with a higher number of planes relatively simply in accordance with a predetermined scheme.

With the foregoing and other objects in view, there is provided, in accordance with the invention, a multiplanar conductor bar and method of producing the same, generally of the type mentioned at the introduction hereto, wherein starting with a 2-plane Roebel bar as a fictitious largest common twisting or transposition unit, a 4-plane conductor bar is formed by simply folding it about an imaginary folding axis located at one-half or the middle of the elevation or height of the fictitious starting bar; that a 6-plane conductor bar is formed by two folding operations about imaginary folding axes located at ⅓ and ⅔, respectively, of the elevation or height of the fictitious starting bar, and so forth, and where generally an n-plane bar is formed by f=n/2−1 folds of the fictitious starting bar, each fold being about one of n/2−1 folding axes, and the respective height or elevation of the folding axes is given by the relationship $m \cdot h/(f+1) = m \cdot 2h/n$, where (m−1, 2, 3 ..., m−1, m; where h is the height or elevation of the starting bar; and where n=4, 6, 8 ..., n−2, n.

The advantages obtainable with the invention are seen particularly in that the multiplanar conductor bar can be produced without performing high-cost braiding work although the twisting or transposition is relatively complicated in the case of 4, 6, 8, and so forth planes. The offsetting or crossover of the individual subconductors as well as the mutual joining thereof into subconductor columns of the respective plans and, finally, into the overall bar can be effected relatively simply. Accordingly, in accordance with another feature of the invention, there is provided a method of producing a multiplanar conductor bar of the just described type having e planes and t subconductors per plane, which comprises, starting with zero bar cross-section plane, inserting the conductors of the respective planes e1, e2 ... en−1, en into an offsetting or crossover template and forming therewith offsets or crossovers therein which correspond to a final disposition thereof in a completely twisted or transposed multiplanar conductor bar; stacking the offset or crossed-over subconductors of the respective plane e1, e2 ... en−1, en so as to form a subconductor column; and mutually telescoping or assemblying the individual subconductor column together and are uniting them into a completed multiplanar conductor bar. The temporary mutual joining of the individual subconductor columns is effected, in this regard, by wrapping insulating tape at regular spaced intervals around the multiplanar conductor bar, and the final union or integration is effected by conventional impregnation and baking processes.

It is known from German Pat. DE-PS No. 478 873 to make a two-plane Roebel bar, twisted or transposed through 360°, by folding a smooth (untwisted) subconductor plane with 2n subconductors, the subconductors extending at an appropriate inclination, three times with the folding axes located at ¼, ½ and ¾ of the height of the starting multiconductor. In this German patent, however, there is provided a smooth starting bar which is twisted or transposed only by the folding operation. Contrary thereto, the starting bar for producing the multiplanar conductor bar according to the invention of the instant application is a 2-plane or biplanar Roebel bar i.e. a bar which is already twisted or transposed. In addition, this starting bar is a fictitious bar which is used merely for purposes of definition; in practice, one need not start out with such a bar, since the individual subconductors of the respective bar plane are offset or crossed over by means of an offsetting or crossover template and are subsequently joined together or united to form the respective subconductor column.

Surprisingly, it was found that there is no upper limit for the number of planes of the multiplanar conductor bar producible in accordance with the invention due to reasons of manufacturing. Thus, conductor bars with 10, 12, 14, 16 and so forth planes can be produced as long as sufficiently wide insertion slots for the winding to be made from the conductor bars are provided and the maximum number of offsetting or crossover locations per length, that can be made from a manufacturing point of view, is not exceeded. A natural limit is imposed, however, by the site of present-day machines, this limit being in the range between 10 and 20 planes per conductor bar. The multiplanar conductor bar according to the invention of this application is therefore extra-ordinarily well suited for machines with a large current-per-slot ration. A preferred application as such multiplanar conductor bars is therefore the stator- and-/or air gap winding of superconductive turbo-generators. Especially in the case of air gap windings, conductors with a relatively large number of planes are required; thus, a number of planes n=12 is already an accepted concept in the present state of the art.

Other features which are considered as characteristic for the invention are set forth in the appended claims.

Although the invention is illustrated and described herein as embodied in a multiplanar conductor bar for electric machines, especially for turbo-generators, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 1A, 1B, 1C and 1D are simplified diagrammatic cross-sectional views of a 4-planar bar formed by folding a (fictitious) biplanar Roebel bar, the 4-planar bar of FIG. 1 being known heretofore;

FIGS. 2A and 2B are diagrammatic views similar to those of FIGS. 1B and 1D, representing in a closer correspondence to actual practice, two twisting or transposition phases in the production of a 4-planar bar from a (fictitious) biplanar Roebel bar, FIG. 2A corresponding to FIG. 1B and FIG. 2B to FIG. 1D, and wherein the 4-planar bar contains 12 subconductors per plane instead of three subconductors per plane;

FIGS. 2C, 2D, 2E and 2F, are diagrammatic views depicting offsetting or crossover steps to be effected for individual subconductors of the first (FIG. 2C), the second (FIG. 2D), third (FIG. 2E) and fourth subconductor plane (FIG. 2F) in the case of a 360° twist or transposition, i.e. the offsetting or crossover steps of the respective subconductor plane which are normally oriented perpendicularly to the plane of the drawing are shown turned or twisted i.e. transposed into the plane of the drawing;

FIG. 3A, a fragmentary perspective view of a heretofore known 4-planar conductor bar showing the upper side thereof;

FIG. 3B is a view similar to that of FIG. 3A of the heretofore known bar illustrated in the latter figure and showing the underside thereof, FIG. 4A is a diagrammatic and schematic elevational view of the heretofore known conductor bar of FIGS. 3A and 3B showing the course of one of the subconductors thereof at the various layer levels over the length of the conductor bar with a 180°/540°/180° twist, or transposition from which it is apparent that the conductor voltages deriving from the slot cross-field are fully compensated or balanced;

FIG. 6A and FIG. 6B are diagrammatic views similar to those of FIGS. 5B and 5D, respectively, representing, more closely corresponding to actual practice, a 6-planar conductor bar (FIG. 6B) formed by doubly folding a fictitious biplanar Roebel bar (FIG. 6A);

FIGS. 6C, 6D, 6E, 6F, 6G and 6H, are diagrammatic views depicting offsetting or crossover steps to be effected for individual planes of the subconductors of the 6-planar conductor bar in accordance with the presentation in FIGS. 2C to 2F;

FIGS. 7A and 7B are fragmentary perspective views, respectively, showing the top and bottom sides of a 6-planar conductor bar according to FIGS. 6A to 6H;

FIG. 8A is a diagrammatic and schematic elevational view of the course of a subconductor loop in a biplanar Roebel bar with 540° twist, this bar serving as fictitious original or starting bar for producing a fully compensated 6-planar conductor bar;

FIGS. 8B and 8C are elevational and plan views, respectively, for one conductor loop of the fully compensated 6-planar conductor bar formed from the biplanar Roebel bar according to FIG. 8A;

Figure 1A:
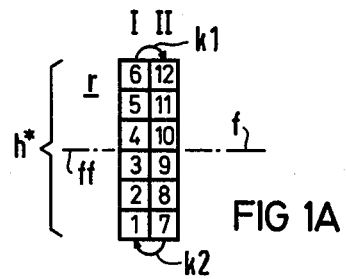
Figure 1B:
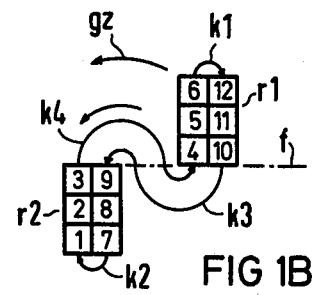
Figure 1C:
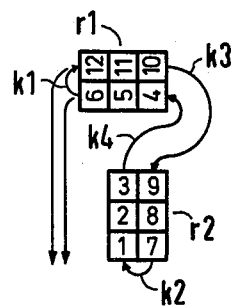
Figure 1D:
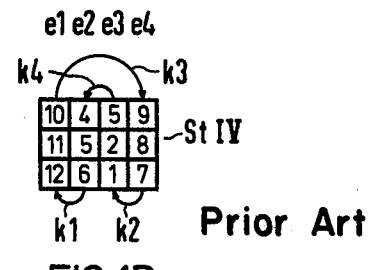
Figure 9A:
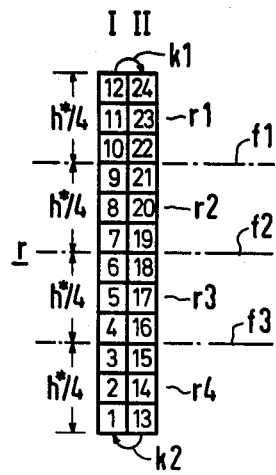
Figure 9B:
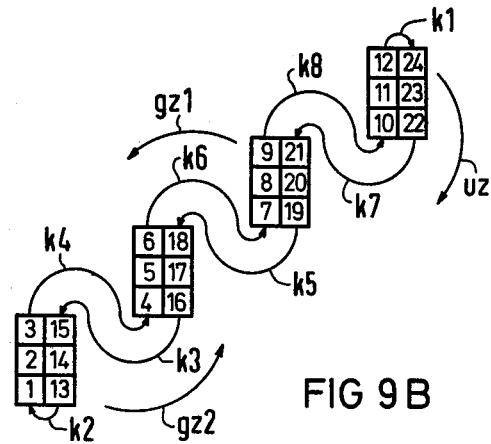
Figure 9C:
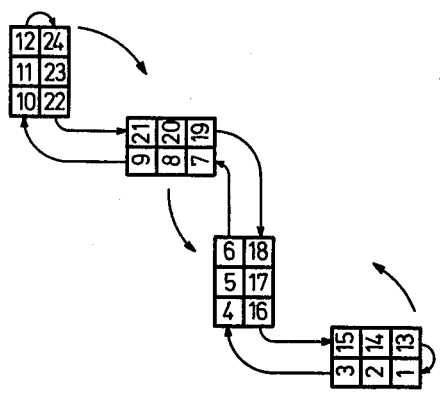
Figure 9D:
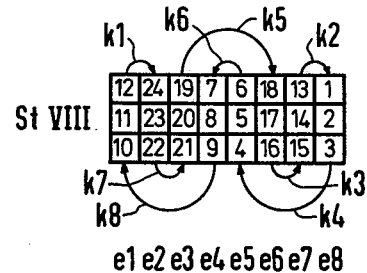
Figure 10A:
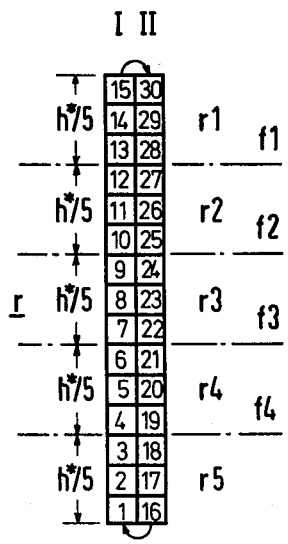
Figure 10B:
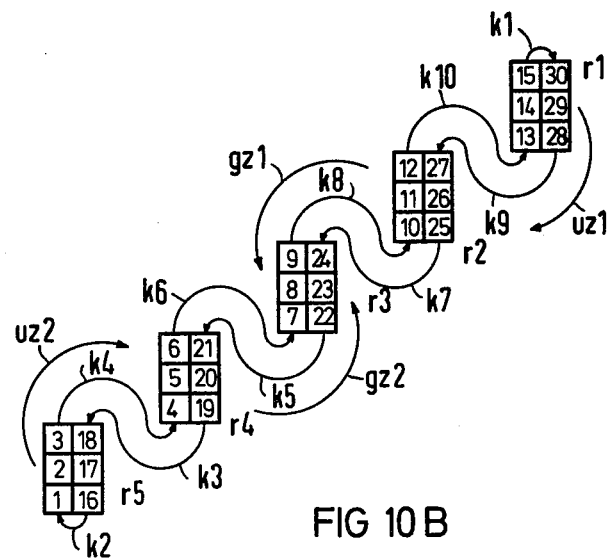
Figure 10C:
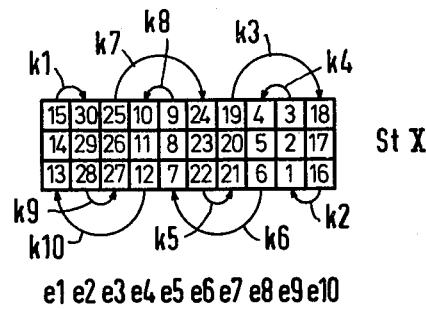

FIGS. 9A, 9B, 9C and 9D, are views, respectively, corresponding to those of FIGS. 1A to 1D of an 8-planar conductor bar formed by triply folding a biplanar Roebel bar, serving as a fictitious original or starting bar; and FIGS. 10A, 10B and 10C are views, respectively, corresponding to those of FIGS. 1A, 1B and 1D of a 10-planar conductor bar formed by quadruply folding a biplanar Roebel bar serving as a fictitious original or starting bar.

Referring now to the drawing and first, particularly, to FIGS. 1A to 1D thereof, there is shown, in a simplified diagrammatic and schematic representation, for a cross-sectional plane located, for example, near the end of the bar, the most important steps in the production of a 4-planar bar (FIG. 4D), starting with a biplanar Roebel bar (FIG. 1A). This Roebel bar has two subconductor planes I and II, each of which as six radially superimposed subconductors 1 to 6 and 7 to 12, respectively. The arrows indicate the twist or transposition cycle of the individual subconductors which, in the illustrated embodiment of FIGS. 1A to 1D, runs through the plane 1 from bottom to top, as viewed in FIG. 1A, for example, is then offset or crossed over to the plane II, and runs through the latter plane from top to bottom to an offsetting or crossover location k°. The upper offsetting point or crossover location is identified by the reference character k1. If the upper half of the starting bar, identified as a whole by the reference character r, is then removed in the plane ff of the folding axis from the lower half r2 of the starting bar r, then a cross-sectional image is obtained which is indicated in FIG. 1B with the additional, flexible or at least conceivably bendable offsetting or crossover locations k3 and k4, which should be thought of a flexible or at least bendable. The upper Roebel bar packet r1 is then folded, in accordance with FIGS. 1B and 1C, counterclockwise about the folding axis f in direction of the arrow gz, in a manner that, initially, an intermediate stage as shown in FIG. 1C occurs and, after further folding, a heretofore known 4-planar Roebel bar in accordance with FIG. 1D is produced having four subconductor planes e1, e2, e3 and e4 and the four subconductor offsetting or crossover locations k1 to k4. Considering the entire bar length and assuming that the 2-plane Roebel bar r was twisted or transposed 360°, a 4-plane conductor bar St IV has now been produced which is likewise twisted or transposed 360° i.e. for a 360° cycle, each subconductor 1 to 12 occupies or assumes every elevational and lateral position within the 4 planes c1 to c4.

In practice, it is not necessary then to make the 4-plane bar St IV by folding a 2-plane Roebel bar (the procedure described with the aid of FIGS. 1A to 1D serving merely for providing a better understanding thereof; on the contrary, it is possible to offset or cross the individual subconductors of the respective bar planes e1 to e4 over in an offsetting or crossover template or jig in such a manner that they can be stacked on top of one another to form a subconductor column. The individual subconductor columns can then be slid together or telescoped afterwards to form the complete 4-plane conductor bar, and mutually united. It is sufficient for this union or integration, for the subconductors to be held together at several locations thereof distributed over the length of the bar by wrapping them thereat with impregnatable insulating tape in such a manner that sufficient mechanical strength of this multiplanar bar is achieved, and so that the thus-formed multiplanar bar can, thereafter, be wrapped completely with insulating tape, especially by machine, or fully impregnated with synthetic resin in an impregnating facility under vacuum, and then hardened.

FIGS. 2A and 2B correspond to the construction phases according to FIGS. 1B and 1D but with the difference that, in the embodiment of FIGS. 2A and 2B, many more subconductors, namely twelve, are provided per plane, as occurs in practice, and the subconductors per se are considerably flatter than in the simplified diagrammatic and schematic representation thereof according to FIGS. 1A to 1D. FIGS. 2D to 2F show the individual subconductor columns T1, T2, T3 and T4, each consisting of twelve subconductors which had been introduced together into an otherwise non-illustrated crossover or offsetting template, and where provided therein column by column, with the offsets or crossovers shown in detail in FIGS. 2C to 2F. Considering in FIG. 2C, for example, the subconductor 12, one notes that, over the length of the bar, it is bent away with a 360°-twist or transposition, initially from plane e1 three offsetting or crossover steps to plane e4, then one offsetting or crossover step in the opposite direction to the subconductor plane e3, then another offsetting or crossover step in the same direction to the subconductor plane e2 and, finally, returning one further offsetting or crossover step to the subconductor plane e1, which is readily understandable by a comparative viewing of FIG. 2B. The other subconductors of the column T1 also have corresponding offsets or crossovers which, however, are spatially phase-shifted. The same applied to the subconductor columns T2 to T4 in accordance with FIG. 2D to FIG. 2F. After the individual subconductors have been previously bent in the offsetting or crossover template, they can be joined together or united to form a subconductor column (T1, T2, T3 or T4). The individual subconductor columns are then telescoped, as described hereinbefore, to form the 4-planar bar, and united or joined together, as clearly seen in FIGS. 3A and 3B.

Figure 3A:
Figure 3B:
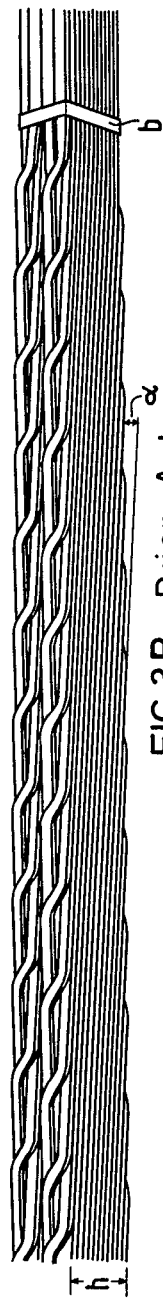

FIG. 3A shows the top side of the heretofore known 4-plane conductor bar in accordance with FIGS. 2B and 2F. It is apparent that the respective upper subconductor of the plane e1 is offset or crossed over by three subconductor widths clockwise (viewing the cross section of the bar from the left-hand end thereof, and then travels downwardly in the plane e4. When it has arrived at the bottom, the respective subconductors are offset or crossed over one subconductor width to the plane e3, travel through this plane upwardly and, having arrived at the top, are offset or crossed over by another subconductor width to the plane e1, travel through this plane upwardly from the bottom and, with a 360°-twist or transposition, return to the starting position thereof (note also the view of the bottom side of the bar according to known FIG. 3B). The wrapping b of the subconductor bar packet is clearly shown in FIGS. 3 and 3B. It can also be seen from FIGS. 3A and 3B that the individual subconductors have been provided with a definite or predetermined inclination $\alpha$ in a manner that they have traversed exactly the bar height h, in the case of a 360°-twist or transposition and a 4-planar bar, in one-fourth of the bar length. Upon viewing FIGS. 2A and 2B as well as FIG. 1A, it is apparent that the folding axis f or the folding plane ff of the fictitious 2-plane Roebel bar r lies at $h*\frac{1}{8}/2$. This elevational position is also provided by the relationship m·2h/n, if the value 1 is assigned for m, and the value 4 for n, where n is the number of planes of the multiplanar conductor bar (n=4, 6, 8 ..., n−2, n) and where the value 1 is to be assigned for m for one folding, the value 1 and the value 2 for two foldings, and the values 1, 2 and 3 and so forth for three foldings.

In a preferred embodiment, the 4-planar bar according to the first embodiment (note FIGS. 3A and 3B) is fully compensated or balanced as far as the voltages generated by the slot cross-field and the radial stray field of the end winding are concerned, which is achieved with the hereinaforedescribed 4-planar bar if it is twisted or transposed in the two end winding regions through 180°, respectively (a twist or tranposition between two respective adjacent planes in sufficient thereat), and in the slot region through 540° i.e. a total of 900° altogether. FIG. 2A shows this for a subconductor loop in a side elevational view, it being apparent that the voltages ($\ominus$-sign) induced in the clockwise oriented subconductor loops and the voltages ($\oplus$-sign) induced in the counterclockwise-oriented conductor loops cancel one another. As is generally known, these voltages are induced by the slot cross-field.

Figure 4A:
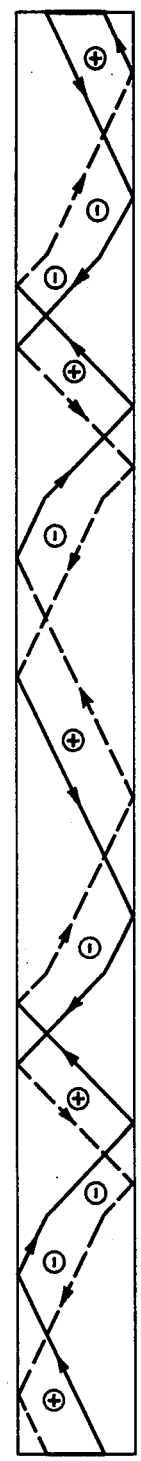
FIG. 4B is a top plan view of the heretofore known 4-plane conductor bar shown in FIG. 4A wherein the individual crossover or offsetting steps of a subconductor and the full compensation or balancing of the conductor voltages resulting from the radial stray field of the end-windings can be seen.
Figure 4B:
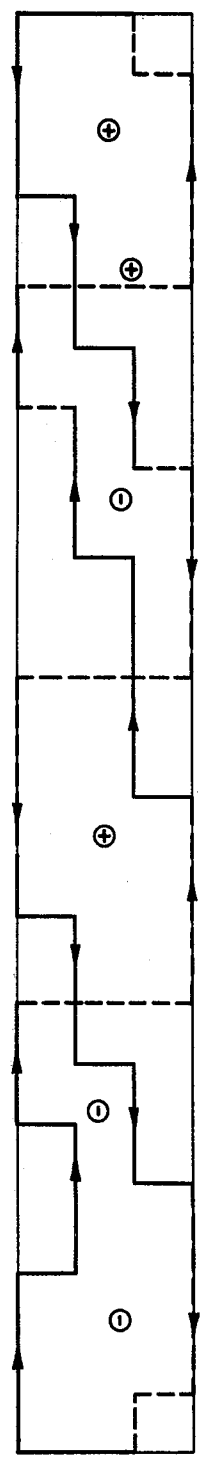
Figure 5A:
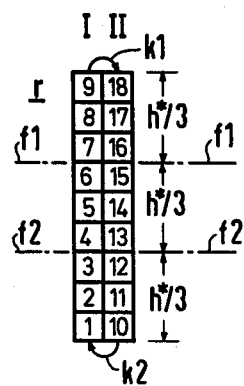
FIGS. 5A, 5B, 5C and 5D are views, respectively corresponding to those of FIGS. 1A to 1D of a 6-planar conductor bar formed by folding a fictitious biplanar Roebel bar.
Figure 5B:
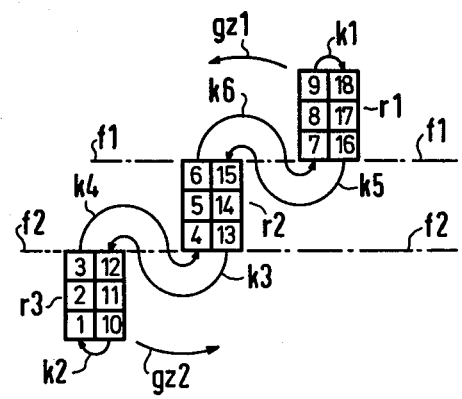
Figure 5C:
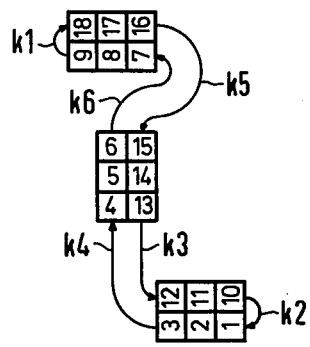
Figure 5D:
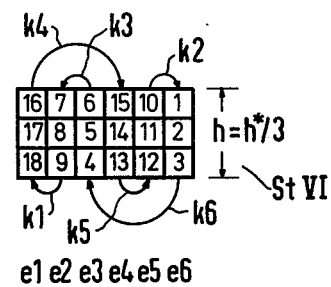

FIG. 4B shows diagrammatically and schematically, in a top plan view, the course taken by a subconductor loop with 180°/540°/180°-twist or transposition for the 4-planar bar, it being apparent that the voltages ($\ominus$-sign for clockwise rotation and $\oplus$-sign for counterclockwise direction of the respective subconductor loop orientation) induced in the individual subconductor loops by the radial end-winding stray field cancel one another since, the same as in FIG. 4A, the enclosed areas with $\oplus$-signs and those with $\ominus$-signs are equal.

FIGS. 5A, 5B, 5C and 5D shown, in a representative manner corresponding to that of FIGS. 1A, 1B, 1C and 1D, individual phases in the production of a 6-planar bar, starting with a fictitious 2-plane Roebel bar (FIG. 5A), which is folded once at the bar elevations of $\frac{1}{3}h*$ and $\frac{2}{3}h*$ (folding axes f1 and f2). The result is a 6-plane conductor bar with the bar planes e1 to e6 and the offsetting or crossover locations k1 to k6 (note FIG. 5D). The folds are effected according to the arrows gz1 and gz2 (note FIG. 5B) always counterclockwise, the resulting bar elevation h being $\frac{1}{3}$ of the bar elevation h* of the fictitious starting or original bar r, of which partial bar packets r1, r2 and r3 (FIG. 5B) are obtained by being drawn asunder. For reasons of simplification, the 6-planar bar shown in FIG. 5D has only three subconductors per bar plane; in practice, there are considerably more, as shown in FIGS. 6A and 6B, where FIG. 6A corresponds to FIG. 5B, and FIG. 6B to FIG. 5D but with the difference that that completed 6-planar bar has twelve subconductors per bar plane and, accordingly, the fictitious starting or original bar has $3 \times 12 = 36$ subconductors per bar plane. FIGS. 6C to 6H again show the individual subconductor columns T1 to T6, which have been given the offsets or crossovers thereof extending in circumferential direction by means of an offsetting or crossover template. Upon considering the upper subconductor 12 of the column T1 of FIG. 6C in conjunction with 6B, it becomes clear that the subconductor 12 is first offset or crosses over three subconductor widths clockwise to the plane e4 (offsetting or crossover location k4), traverses the plane e4 from top to bottom and, after arriving at the bottom, is offset or crossed over counterclockwise by one subconductor width to the plane e5 (offsetting or crossover location k5), traverses the subconductor plane e5 from the bottom up and, after arriving at the top, is offset or crosses over clockwise by a further subconductor width to the plane e6 (offsetting or crossover location k2), traverses this plane e6 from the top down and, after arriving at the bottom, is again offset or crossed over by three subconductor widths clockwise to the plane e3 (offsetting or crossover location k6), traverses this plane e3 from the bottom up and, after arriving at the top, is offset or crossed over counterclockwise by one subconductor width to the plane e2 (offsetting or crossover location k3), traverses this plane e2 from the top down and, after arriving at the bottom, is offset or crossed over clockwise by another subconductor width to the starting plane e1 thereof and traverses the latter plane to the starting position from the bottom up. This is based upon a 360°-twist or transposition i.e. each subconductor of the 6-planar bar occupies every elevational position and every lateral position within the bar packet St VI (note FIG. 5D).

This becomes clear also when considering FIGS. 7A and 7B, of which FIG. 7A provides a view of the top side of the bar, and FIG. 7B a view of the bottom side of the bar, and the subconductors within the bar packet again have an inclination $\alpha$. When considering FIG. 7A and the upper part of FIGS. 6B and 7B, respectively, and the lower part of FIG. 6B from a comparative standpoint, the twist or transposition becomes readily understandable. The wrapping b of the bar packet, which serves as a temporary fixing or securing means, is again shown in FIGS. 7A and 7B.

The production of the finished bar packet St VI by stacking the previously offset or crossed over subconductors t to form the respective subconductor columns T1 to T6, and the telescoping assembly of these subconductor columns T1 to T6 is to be effected in a manner analogous to that described hereinbefore with respect to FIGS. 2C to 2F.

FIGS. 8A, 8B and 8C show a preferred embodiment of a fully compensated 6-planar bar which is twisted or transposed 540° in the slot region, the fictitious starting bar according to FIG. 8A having previously been twisted or transposed 540°, and the finished 6-planar bar can be thought of as having been produced by folding the 2-plane Roebel bar r according to FIG. 8A twice about the folding axes f1 and f2, respectively, which lie at $\frac{1}{3}h^*$ and $\frac{2}{3}h^*$, respectively. The representative conductor loop according to FIG. 8A then attains the form which is apparent in FIG. 8B where, again, there is shown in a side elevational view that the individual subconductor loops are compensated with respect to the voltages generated by the slot cross-field, as viewed over the length of the bar, as is illustrated by the counterclockwise oriented ⊕ conductor loops and the clockwise oriented ⊖ conductor loops (note also in this regard, the representation according to FIG. 4A for a 4-planar bar). FIG. 8C shows, in a presentation corresponding to that of FIG. 4B, the top view of a representative conductor loop of the 6-planar bar, which has several mutually crossing subloops, the areas definable by the clockwise oriented ⊖-loops and the counterclockwise oriented ⊕-loops being equal, so that also the voltages induced by the radial end-winding stray field are cancelled.

FIGS. 9A, 9B and 9C again show, in a simplified diagrammatic and schematic representation corresponding to that according to FIGS. 1A to 1D, the production of an 8-planar bar St VIII (FIG. 9D), beginning with a fictitious starting bar r constructed as a 2-plane Roebel bar and having a bar elevation h* and two subconductor planes I and II, respectively, with subconductors 1 to 12 and 13 to 24. Folding is effected about the folding axis f1 clockwise in accordance with the arrow uZ, and about the folding axes f2 and f3 counterclockwise in accordance with the arrows gz1 and gz2. The finished 8-planar bar St VIII has eight planes e1 to e8 and, accordingly, eight offsetting or crossover locations k1 to k8. As mentioned hereinbefore, the schematic and diagrammatic views of FIGS. 9A to 9D serve for an improved understanding; in practice, of course, no 2-plane Roebel bar in accordance with FIG. 9A is actually used. On the contrary, as previously explained herein in connection with the production of the 4-plane and 6-plane bar, the individual subconductor columns T1 yo T8 (not shown) are obtained by offsetting or crossing over the individual subconductors within an offsetting or crossover template and by subsequently uniting or joining them together. Since an 8-plane conductor bar is not fully compensated with a twist or transposition of 360°, a twist or transposition of 180°, respectively, in each of the coil end-winding regions and of 540° in the slot region is effected again in a preferred embodiment, as explained hereinafore in connection with the 4-planar bar, so that then this 8-planar bar is fully compensated with respect to the voltages induced by the slot cross-field and the radial coil end-winding stray field.

FIGS. 10A, 10B and 10C, finally, show in a manner corresponding to that of FIGS. 1A, 1B and 1D, the formation of a 10-planar bar, starting with a 2-plane Roebel bar r with two planes I and II and subconductors 1 to 15 in plane I and 16 to 30 in plane II, and with folding axes f1 to f4 as well as with individual bar subpackets r1 to r5. FIG. 10B shows individual offsetting or crossover locations k3 to k10 which are obtained, in addition to the offsetting or crossover locations k1 and k2, wherein the subpackets r1 to r5 are pulled apart, and also shows the folding directions uz1 and uz2 for the subconductor packets r1 and r5, and gz1 and gz2 for the subconductor packets r2 and r4, respectively. The result is the 10-plane conductor bar 3t X with the planes e1 to e10 and the individual offsetting or crossover locations k1 to k10. Also, with respect to this 10-planer bar, that which has been hereinbefore started in connection with the practical production of the first and second embodiments (the 4-plane and 6-plane bars) applies as well.

It is understood that in the four embodiments described hereinbefore, as well as in multiplanar conductor bars with more than ten conductor planes, the subconductors can be constructed, at least in part with respect to the total number of conductors, as hollow subconductors for the purpose of liquid cooling, the hollow subconductors being twistable or transposable together and, if there are also solid i.e. non-hollow subconductors, i.e. in the case of a so-called mixed bar, being also twistable together with the solid subconductors. In this regard, a preferred embodiment is attained wherein the hollow subconductors are used especially for heat removal and less, or virtually not at all for current conduction (the latter function being assumed by the solid subconductors), the hollow subconductors being then formed of a metal having lower conductivity than that of the solid subconductors. Thus, the solid subconductors, especially, are formed of copper and the hollow subconductors of steel, which also has the advantage that, with a given hydraulic diameter, they have sufficient mechanical strength which enables them to be provided with the offsetting or crossover locations without adverse effect on the mechanical strength thereof and also to have sufficient stability against vibrations within the bar packet. In this manner, eddy currents flowing through the hollow subconductors can be held to negligibly small values; in any event, for a given hydraulic diameter and a given cross section of the hollow subconductors, the resistivity of the latter can be optimized so that the eddy current losses are minimized, as viewed over the total bar cross section.

In FIG. 8A, the axial length of the slot part of the winding bar is identified by the reference character l and that of the end-winding part thereof by ln, where, as can be seen, a 540°-twist or transposition is effected in the slot part with a respective 180°-rotation at ⅓l, ⅓l and ⅓l. The axial length lw of the coil end-winding part is divided, with ½lw, respectively, at the two bar ends.

We claim:

1. Multiplanar conductor bar for electric machines comprising:
    (a) subconductors superimposed radially in a number n of circumferentially mutually adjacent planes, n being a whole, even number between six and ten, inclusive, and transposed by at least 360°;
    (b) a total of two groups of two adjacent subconductor planes, respectively, formed at upper and lower sides of the multiplanar conductor bar by exclusively mutual crossover of the semiconductors of said two adjacent planes;
    (c) a total of (n/2)−1 groups of four adjacent subconductor planes, respectively, formed at said upper and lower sides of the multiplanar conductor bar by exclusively mutual crossover of the subconductors of the respective four adjacent subconductor planes and exclusively in a transition between the respective outer and the respective inner planes of said four planes;
    (d) the respective groups of four adjacent planes being mutually offset at said lower side with respect to said upper side by two subconductor planes;
    (e) each of said subconductors traversing all layer levels between two crossover points in each subconductor plane alternatingly in descending and ascending order in successive planes;
    (f) the individual crossed-over subconductors of each of said subconductor planes being stacked so as to form a respective subconductor column, the subconductor columns being mutually telescoped and united into the multiplanar conductor bar.

* * * * *